US006995688B2

(12) United States Patent
Reynolds

(10) Patent No.: US 6,995,688 B2
(45) Date of Patent: Feb. 7, 2006

(54) METHOD AND APPARATUS FOR THWARTING ATTEMPTS TO HIJACK AIRCRAFT AND FOR RESPONDING TO OTHER AIRCRAFT EMERGENCIES

(76) Inventor: James S. Reynolds, 19538 Celtic St., Northridge, CA (US) 91326

( * ) Notice: Subject to any disclaimer, the term of this patent is extended or adjusted under 35 U.S.C. 154(b) by 0 days.

(21) Appl. No.: 10/253,860

(22) Filed: Sep. 23, 2002

(65) Prior Publication Data

US 2003/0128122 A1    Jul. 10, 2003

Related U.S. Application Data

(60) Provisional application No. 60/324,770, filed on Sep. 24, 2001.

(51) Int. Cl.
*G08B 21/00* (2006.01)
(52) U.S. Cl. ............... 340/945; 340/506; 340/961; 340/963; 244/96; 244/75 R; 244/190; 701/2; 701/3; 701/301
(58) Field of Classification Search ............... 340/945, 340/990, 961, 963, 980, 506, 539, 825.72, 340/825.36, 213; 701/301, 7, 3, 36, 120; 711/122, 123, 128; 244/96, 75 R, 190, 181, 244/183, 17.13, 17.11
See application file for complete search history.

(56) References Cited

U.S. PATENT DOCUMENTS

| | | | | |
|---|---|---|---|---|
| 5,448,233 A | * | 9/1995 | Saban et al. | 340/963 |
| 5,904,724 A | * | 5/1999 | Margolin | 701/120 |
| 6,076,042 A | * | 6/2000 | Tognazzini | 701/301 |
| 6,231,002 B1 | * | 5/2001 | Hibma et al. | 711/122 |
| 2003/0055540 A1 | * | 3/2003 | Hansen | 701/3 |

* cited by examiner

*Primary Examiner*—Davetta W. Goins
(74) *Attorney, Agent, or Firm*—Bruce H. Johnsonbaugh

(57) ABSTRACT

Apparatus and method are provided for detecting and responding to aircraft emergencies and, in particular, thwarting attempts to hijack an aircraft including the storage in aircraft computer memory of a pattern of aircraft flight characteristics assumed to be unique to aircraft controlled by hijackers. The invention also periodically detects real-time flight characteristics from the aircraft automatic sensing apparatus and compares the real-time flight characteristics with the stored patterns of assumed aircraft flight characteristics of a hijacked aircraft. The assumed aircraft flight characteristics includes thresholds such as exceeding given airspeeds or altitudes less than a specific altitude. If an assumed stored pattern is matched by the real-time flight characteristics, automatic control is taken of the autopilot, attempts to manually control the aircraft are overridden and the aircraft is caused to automatically begin flying in an emergency holding pattern. The invention detects and responds to other emergencies also.

8 Claims, 4 Drawing Sheets

METHOD AND APPARATUS FOR THWARTING ATTEMPTS TO HIJACK AIRCRAFT AND FOR RESPONDING TO OTHER AIRCRAFT EMERGENCIES

CROSS REFERENCE TO RELATED APPLICATION

This application claims the benefit of and priority from U.S. Provisional Application Ser. No. 60/324,770 filed on Sep. 24, 2001.

BACKGROUND AND BRIEF SUMMARY OF THE INVENTION

The present invention thwarts aircraft hijackings and would have prevented the horrific tragedies of Sep. 11, 2001 at the World Trade Center, at the Pentagon and in the fields of Pennsylvania.

A significant advantage of this invention is that one embodiment may be retrofitted into virtually all existing commercial airliners immediately and at relatively low cost.

The present invention in one embodiment provides a relatively small microcode module installable in existing automatic flight controllers of commercial airliners. The modified microcode detects certain aircraft flight characteristics utilized only by terrorists, such as flying at low altitudes (for example, less than 8,000 feet altitude) at relatively high speeds (for example, more than 300 knots).

According to the present invention, if patterns of aircraft flight characteristics unique to terrorist hijackers are recognized by the modified microcode, the autopilot takes control of the aircraft and several significant steps follow. First, manual control of the aircraft is overridden temporarily. Secondly, the autopilot takes the aircraft into a controlled "parking" pattern, for example, the aircraft climbs to a given altitude (e.g. 17,000 feet) and flies in a circular pattern for a given amount of time (e.g. 15 minutes). Thirdly, contact is made by the presumably hijacked aircraft with ground controllers, and ground controllers are given an opportunity to either return the aircraft to cockpit control if no hijacking was in progress, or to decide to land the aircraft automatically if a hijacking is in progress. To return control of the aircraft an unlock code from the ground controllers must be entered into the autopilot, otherwise the microcode will cause the autopilot to autoland at the closest airport with sufficient runway and emergency facilities.

Most airline terrorist protection methods rely on detecting the hijacker and weapons before they board the airplane. Very little protection exists after the terrorist has seized control. The present invention detects the hijack in process and returns control of the airplane to ground based authorities. In its simplest implementation, the first embodiment of the invention is primarily a group of microcode subroutines that are added to the existing flight management computer system.

A second embodiment of the present invention provides a separate, microprocessor-based module which is placed in the aircraft. This embodiment has significant advantages over the first embodiment; for example, the module may be loaded with new microcode from a remote location.

The present invention also provides responses to aircraft in-flight emergencies other than hijackings. For example, the invention is capable of detecting in-flight emergencies such as fires, loss of cabin pressure, interruption of oxygen supply, etc., and notifying ground control as well as the onboard flight crew.

This invention is analogous to a fire extinguisher mounted on the wall and is only used in the event of a dire emergency. The invention interacts with the aircraft flight controls to a minimum extent and only in a sensed dire emergency.

A primary object of the invention is to provide a method and apparatus for thwarting attempts to hijack aircraft that may be quickly and inexpensively retrofitted into virtually all existing commercial airliners.

A further object of the invention is to provide a method and apparatus for detecting and responding to aircraft in-flight emergencies other than a hijacking.

A further object of the invention is to thwart an attempted hijacking by providing a method and apparatus for automatically sensing the presence of a hijack in process, taking automatic control of the aircraft, overriding attempts to manually control the aircraft and automatically causing the aircraft to fly in an approved emergency holding pattern.

Other objects and advantages of the invention will become apparent from the following description and the drawings wherein:

DETAILED DESCRIPTION OF THE DRAWINGS

The First Embodiment

In the first embodiment of the invention, the microcode is quickly and inexpensively added to a fly-by-wire aircraft's existing flight management computer and/or automatic pilot. The microcode monitors and periodically detects certain aircraft flight parameters and compares the trend in said parameters against a database of stored patterns of flight characteristics unique to hijacking tactics.

Definitions

The phrase "patterns of flight characteristics," as used herein and in the claims, is used in its broadest sense to include thresholds as well as specific characteristics. For example, one pattern could be airspeed which exceeds a threshold of 300 knots and altitude which is less than a threshold of 8,000 feet.

The word "microcode" includes software code, and schematic code for the programmable gate arrays.

The word "autopilot" encompasses both autopilot and/or flight computer.

The phrase "holding pattern" includes either a course change or a closed flight pattern.

In the detection phase, a detection subroutine is activated once per second. The routine monitors the aircraft flight characteristics such as (without limitation) altitude, speed, bank angle, pitch angle, rate of descent and pressurization. If the trend in aircraft flight parameters passes thresholds stored in the database, control of the aircraft is transferred to the microcode and a pre-defined sequence of actions designed to thwart the hijacking commences. As an example, the microcode may command the aircraft's flight management computer and/or automatic pilot to assume control of the aircraft, ignore control inputs from the aircraft flight deck, broadcast an emergency message to ground-based air traffic control using either the aircraft's transponder or VHF radio, maneuver the aircraft to a pre-defined altitude and airspeed, and begin to fly an emergency holding pattern as defined by Federal Aviation Regulations. After a pre-defined period of time the microcode releases control of the aircraft to those on-board, returning the aircraft's automatic pilot to "wing leveler," "altitude hold" and "airspeed hold" mode, ensuring a smooth transition back to human control. It is intended that during the time the microcode has control of the aircraft, ground controllers will dispatch an intercept aircraft to the location of the hijacked flight. Upon arrival, the intercept aircraft's pilot will have the time to thoughtfully evaluate the nature of the emergency and decide upon an appropriate resolution to the problem before control of the hijacked aircraft is returned to those on-board. After releasing control of the aircraft, the microcode returns to its monitoring mode, and will re-engage if aircraft flight parameter trends warrant. If necessary, ground control may retain control of the hijacked aircraft and remotely cause the aircraft to autoland at an appropriate airfield.

Figure 1:
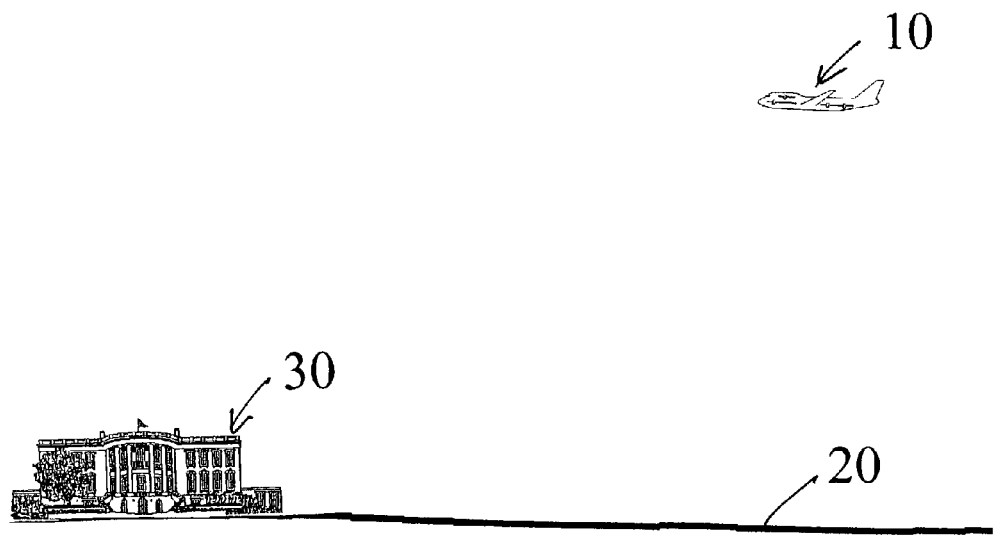
FIG. 1 is a schematic representation, not to scale, of a commercial aircraft flying at a safe altitude, which is about to be hijacked.

FIGS. 1–5 are not to scale and are intended to illustrate an example of how the invention may be utilized. FIG. 1 shows an aircraft 10 (about to be hijacked) flying at a normal cruising altitude of 35,000 feet above ground 20 and at normal speed. The White House 30 is also shown. The aircraft includes in its stored patterns of flight characteristics, assumed to be unique to hijackers, a pattern including an altitude of less than 8,000 feet and an airspeed of greater than 300 knots.

Figure 2:
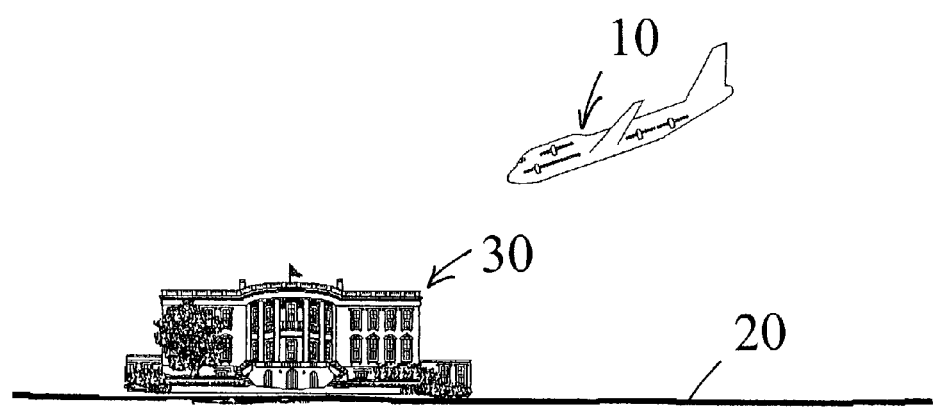
FIG. 2 illustrates the aircraft of FIG. 1 after it has been hijacked and flown to a sufficiently low altitude at a sufficiently high speed to trigger the automatic takeover of control of the aircraft by the present invention.

FIG. 2 illustrates aircraft 10 exhibiting the stored pattern, i.e., aircraft 10 is flying below 8,000 feet at a speed in excess of 300 knots. Aircraft 10 is aimed at White House 30. The detection routine of the invention recognizes the stored pattern, and takes automatic control of the aircraft, including overriding and/or ignoring manual flight commands.

Figure 3:
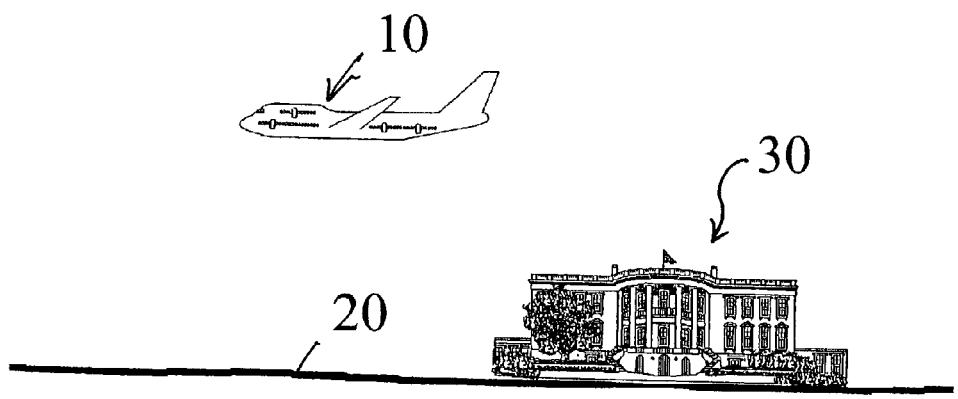
FIG. 3 illustrates how the aircraft, under automatic control of the present invention, has assumed a level flight attitude and has avoided the hijackers' intended target.

FIG. 3 illustrates aircraft 10 under automatic control of the invention, after having been leveled off and having avoided a collision with White House 30.

Figure 4:
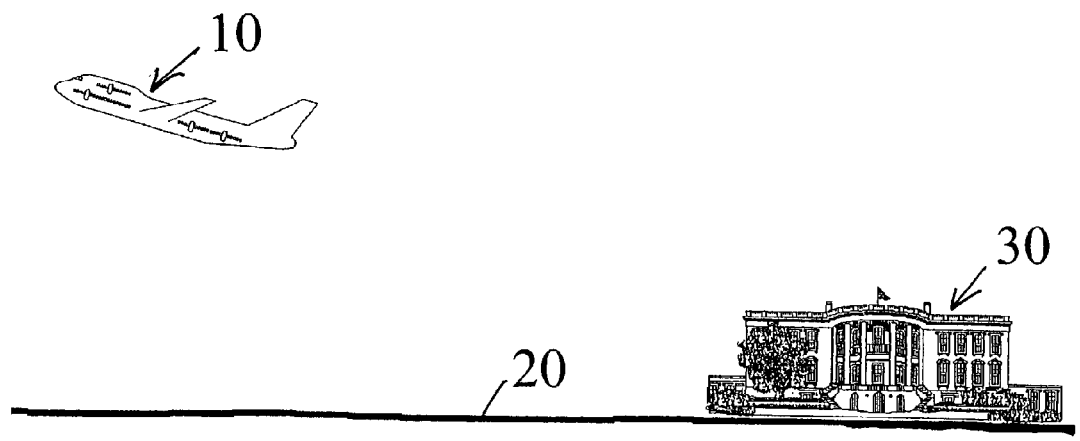
FIG. 4 illustrates schematically how the present invention has automatically caused the aircraft to gain altitude.

In FIG. 4, the aircraft 10 is automatically caused to start climbing toward a safe altitude of 17,000 feet at a safe speed.

Figure 5:
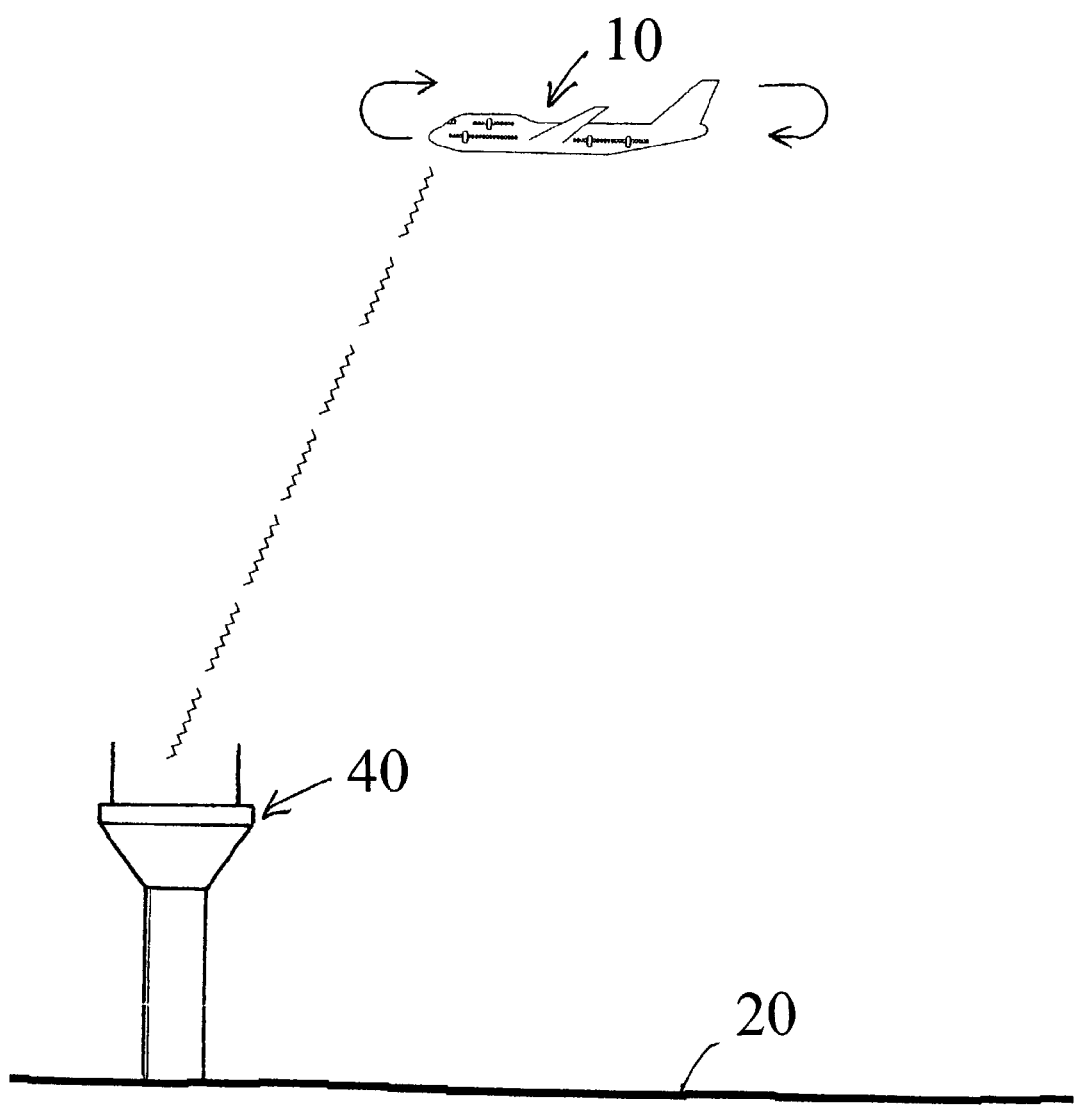
FIG. 5 illustrates schematically how the aircraft of FIGS. 1–4 has reached a safe altitude, is circling in an appropriate emergency flight pattern and is in automatic and direct contact with ground control.

In FIG. 5, aircraft 10 is circling at 17,000 feet and communicating with ground control 40. If the event was a false alarm as determined from ground control and/or intercept aircraft, manual control is returned to the cockpit. If a hijacking is in progress, the aircraft 10 may be autolanded under ground control at an appropriate airfield with necessary security forces to deal with and apprehend the hijackers.

Figure 6:
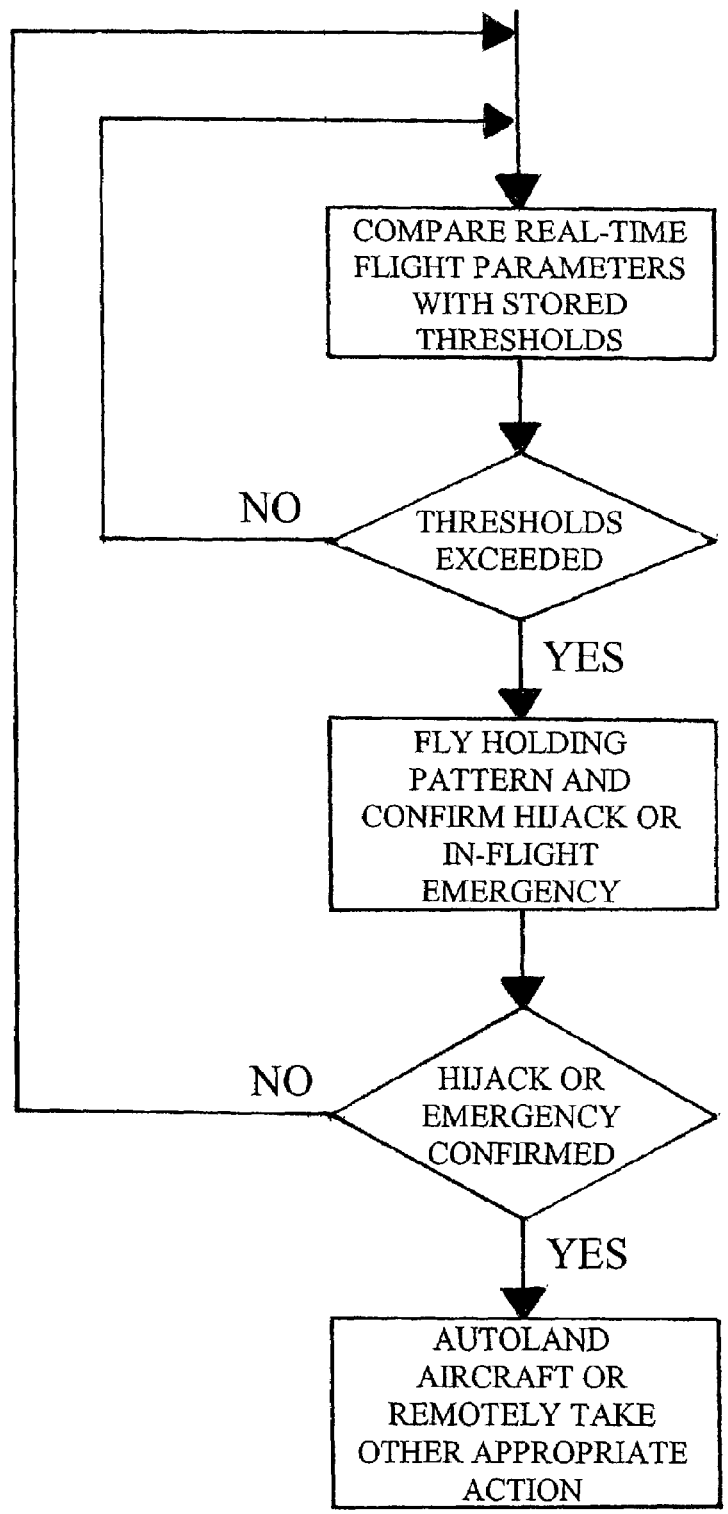
FIG. 6 is a flow chart illustrating the invention.

FIG. 6 is a flow chart illustrating the logic as applied to an aircraft that is being hijacked.

The Second Embodiment

The second embodiment of the invention is a microprocessor-based module which features loadable microcode and has a variety of inputs and outputs which interface to several of the aircraft's existing systems (for example, flight management computer, automatic pilot, navigation and communication radios, transponder, etc.). The module also has loadable gate arrays for the hardware, in addition to loadable microcode for the software. Furthermore, the module preferably has its own separate GPS receiver. For example, the added input and output capacity of the module may be utilized to prevent resetting or power being turned off on the flight computer, autopilot or transponder. These features allow the module to be largely independent of the aircraft avionics. The emergency control module consists of a microprocessor, a writeable microcode store element and programmable gate arrays. The writeable control store contains the operating microcode as well as the schematic code for the loadable gate arrays. This allows the control module to be updated with future versions of microcode which not only alters and/or improves the functionality of the code run by the microprocessor but can change the effective schematic diagram of the control module. In a literal sense, this allows the inputs and outputs to be completely redefined and improved. Should the need arise, the module can be updated from the ground, allowing the system to be easily and securely upgraded or altered on an emergency basis. Loading of the emergency control module may be performed as follows. A secure transfer of data is made by module echoing of characters as they are loaded into temporary storage. Next, the loading computer compares the echoed data to that which it transmitted, along with check sum data. If the data matches, the control module is released to load the code into its permanent storage. Finally, the control module performs additional check sums and if successful loads into permanent storage, enabling the new code. There are significant advantages to this implementation over the "software microcode-only" implementation of the first embodiment discussed above.

Advantages of the Second Embodiment

1. Upgrade Path As a separate apparatus, the microcode module (both hardware and software) may be upgraded from external sources. This allows the basic functionality of the device to be upgraded and modified as future needs or threats are identified.

2. External Control of Aircraft Instructions to be carried out by the device can be uploaded from ground control via an RF link while the aircraft is in flight. For example, ground control might modify the parameters of the holding pattern, or command the aircraft to initiate an automatic landing sequence at an appropriately equipped airport. This allows the device's response behavior to be completely appropriate to the specific emergency as determined by ground control.

3. Enhanced Telemetry Aircraft parameters can be interrogated from ground control. This allows ground control to actively monitor and control the aircraft while it is in flight.

4. Enhanced Triggering Options Alarm conditions can be initiated via a manual "emergency activation switch" on the flight deck by members of the aircraft flight crew, or by entering a code from keypads in the passenger compartment. Had a keypad been available to the passengers of the ill-fated 911 aircraft that crashed in the fields of Pennsylvania, an alarm could have been initiated by the keypad. This would have allowed the aircraft to be in a holding pattern while the passengers stormed the cockpit, thus avoiding the catastrophe.

5. Multiple Response Scenarios The increased complexity of the microcode allows the device to have multiple levels of alarm states to facilitate variable responses to assure appropriate responsive action to the circumstances of the emergency. The most basic response may simply alert ground control and/or the pilot, while the most extreme response would seize control of the aircraft.

6. Enhanced Input and Output Capabilities Control of virtually any current or future aircraft system can be programmed into the microcode set as may be required in the future.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. Apparatus for thwarting an attempt to hijack an aircraft, wherein said aircraft has sensing apparatus for automatically sensing a plurality of aircraft flight characteristics and said aircraft has a flight management computer system which includes modifiable microcode software, said apparatus comprising:

storage means for storing a pattern of aircraft flight characteristics assumed to be unique to aircraft controlled by hijackers, detection means for periodically comparing the output of said aircraft's flight characteristic sensing apparatus with said stored pattern of assumed aircraft flight characteristics of a hijacked aircraft, control means for taking automatic control of said flight management computer when said stored pattern of assumed flight characteristics is detected and for ignoring attempts to manually control said aircraft, and emergency flight control means for causing said aircraft to automatically begin flying an emergency holding pattern, wherein said storage means, detection means, control means and emergency flight control means are each one or more microcode software subroutines which are added to said aircraft flight management computer.

2. The apparatus of claim 1 wherein said modifiable microcode software may be modified remotely from ground control, whereby said modifiable microcode software is changeable in response to the dynamic demands of a particular emergency.

3. The apparatus of claim 2 wherein said modifiable microcode software may be updated periodically to include changes of assumed aircraft flight characteristics of a hijacked aircraft.

4. The apparatus of claim 2 wherein said modifiable microcode software may be remotely modified during the course of a hijacking to either autoland the aircraft at an appropriate airfield or fly other courses under ground control.

5. Apparatus for responding to an in-flight emergency in an aircraft, wherein said aircraft has sensing apparatus for automatically sensing a plurality of aircraft flight characteristics and said aircraft has a flight management computer system which includes modifiable microcode software, said apparatus comprising:

storage means for storing patterns of aircraft flight characteristics assumed to be unique to aircraft subjected to in-flight emergencies, detection means for periodically comparing the output of said aircraft's flight characteristic sensing apparatus with said stored patterns of assumed aircraft flight characteristics of an aircraft with an in-flight emergency, control means for taking automatic control of said autopilot when one of said stored patterns of assumed in-flight emergency characteristics is detected and for ignoring attempts to manually control said aircraft, and emergency response means for appropriate action in the circumstances, wherein said storage means, detection means, control means and emergency response means are each one or more microcode software subroutines which are added to said aircraft flight management computer.

6. The apparatus of claim 5 wherein said modifiable microcode software may be modified remotely from ground control in response to the dynamic demands of a particular emergency.

7. The apparatus of claim 5 wherein said modifiable microcode software may be updated periodically to include changes of assumed aircraft flight characteristics of an aircraft having an in-flight emergency.

8. The apparatus of claim 5 wherein said modifiable microcode software may be modified during the course of an emergency to remotely autoland said aircraft at an appropriate airfield.

* * * * *